US012800431B2

(12) United States Patent
Zhou et al.

(10) Patent No.: US 12,800,431 B2
(45) Date of Patent: Nov. 17, 2026

(54) VIBRATION TEST PLATFORM FOR AUTOMOBILE GENERATOR

(71) Applicant: SUZHOU SUSHI TESTING GROUP CO., LTD., Suzhou (CN)

(72) Inventors: Jin Zhou, Suzhou (CN); Qionghua Zhong, Suzhou (CN)

(73) Assignee: SUZHOU SUSHI TESTING GROUP CO., LTD., Suzhou (CN)

(*) Notice: Subject to any disclaimer, the term of this patent is extended or adjusted under 35 U.S.C. 154(b) by 457 days.

(21) Appl. No.: 18/695,714

(22) PCT Filed: May 31, 2022

(86) PCT No.: PCT/CN2022/096273
§ 371 (c)(1),
(2) Date: Sep. 13, 2024

(87) PCT Pub. No.: WO2023/045391
PCT Pub. Date: Mar. 30, 2023

(65) Prior Publication Data

US 2025/0334478 A1 Oct. 30, 2025

(30) Foreign Application Priority Data

Sep. 27, 2021 (CN) .......................... 202111134760.8

(51) Int. Cl.
*G01M 7/02* (2006.01)
*G01M 7/04* (2006.01)

(52) U.S. Cl.
CPC .............. *G01M 7/027* (2013.01); *G01M 7/04* (2013.01)

(58) Field of Classification Search
CPC ..................................................... G01M 7/027
See application file for complete search history.

(56) References Cited

U.S. PATENT DOCUMENTS 6,414,452 B1 * 7/2002 Okuda .................. G01M 7/022 318/128
6,864,962 B2 * 3/2005 Morisada ............... G03B 27/60 355/75
(Continued)

FOREIGN PATENT DOCUMENTS

CN 1743824 A 3/2006
CN 107449579 A 12/2017
(Continued)

OTHER PUBLICATIONS

International Search Report for PCT/CN2022/096273 mailed on Aug. 2, 2022.

*Primary Examiner* — Eric S. McCall
(74) *Attorney, Agent, or Firm* — Birch, Stewart, Kolasch & Birch, LLP

(57) ABSTRACT

A vibration test platform for an automobile generator (13), the vibration test platform comprising: a vibration table (1), a driving device (2), and a tension device (3), wherein the vibration table (1) comprises a table body (11) and a movable coil (12) located in the table body (11), and the movable coil (12) extends out of an upper end surface of the table body (11); a generator (13) is fixedly provided on the table body (11), a rotating shaft of the driving device (2) is rotatably connected to a rotor of the generator (13) by means of a belt (4), and the tension device (3) applies a first tensile force to a stator of the generator (13); and when the movable coil (12) is stationary, a second tensile force of the belt (4) on the rotor and the first tensile force are in the same straight line, and have opposite directions and equal magnitudes, and the straight line is perpendicular to a vibration direction of the movable coil (12). The vibration test platform can perform a vibration test on the generator (13) in an automobile.

10 Claims, 3 Drawing Sheets

(56) References Cited

U.S. PATENT DOCUMENTS

| | | | | |
|---|---|---|---|---|
| 2007/0062293 | A1* | 3/2007 | Lund | G01M 7/04<br>73/663 |
| 2008/0092662 | A1* | 4/2008 | Mizuguchi | G01M 7/04<br>73/666 |
| 2022/0291079 | A1* | 9/2022 | Wu | G01M 7/045 |
| 2024/0175503 | A1* | 5/2024 | Tao | F16K 17/00 |
| 2024/0328893 | A1* | 10/2024 | Wu | G01M 7/022 |

FOREIGN PATENT DOCUMENTS

| | | | |
|---|---|---|---|
| CN | 207472522 | U | 6/2018 |
| CN | 111649895 | A | 9/2020 |
| CN | 113720561 | A | 11/2021 |
| CN | 215952917 | U | 3/2022 |
| JP | 3266689 | B2 | 3/2002 |
| WO | WO 2021/093026 | A1 | 5/2021 |

* cited by examiner

VIBRATION TEST PLATFORM FOR AUTOMOBILE GENERATOR

The present application claims the priority of Chinese Patent Application No. 202111134760.8 filed on Sep. 27, 2021, and titled "Vibration test platform for an automobile generator", the content of which is hereby incorporated by reference into this application.

TECHNICAL FIELD

The present invention relates to the field of vibration technology, and particularly to a vibration test platform for an automobile generator.

BACKGROUND

Automobiles are a common mode of transportation in daily life. In automobiles, there are usually many electronic devices that require power. Therefore, generators are commonly installed in vehicles, powered by the engine to drive the rotation of the generator's rotor, thereby providing electrical energy to the electronic devices.

It is understandable that during the motion of the automobile, vibrations are produced which can affect the normal operation and lifespan of the generator, especially when the generator is working. Therefore, it is necessary to conduct vibration testing on the generator during the design and production process of the automobile.

SUMMARY

An object of the present invention is to provide a vibration test platform for an automobile generator.

In particular, the present invention is directed to a vibration test platform for an automobile generator, characterized in that it comprises:

a vibration table, a driving device, and a tension device;

the vibration table defining a table body and a movable coil located within the table body, an upper end of the movable coil extending from an upper surface of the table body, and the vibration table being capable of driving the movable coil to vibrate in an up-and-down direction; the driving device and the tension device being respectively located on the left and right sides of the movable coil;

a generator fixedly mounted on the upper surface of the table body, a rotating shaft of the driving device being rotationally connected to a rotor of the generator through a first belt, and the tension device applying a first tension force to a stator of the generator; wherein when the movable coil is stationary, a second tension force from the first belt on the rotor is in a same line, opposite in direction, and equal to the first tension force, and the same line is perpendicular to the direction of vibration of the movable coil.

Further, the driving device defines a first tension wheel for adjusting the tension of the first belt.

Further, the vibration test platform further comprises a test box, fixedly connected to the upper surface of the table body, with a receiving space set inside the test box and a through hole at the lower part of the test box, which connects to the receiving space, and the upper end of the movable coil extends into the through hole; the tension device is fixedly connected to a bottom surface of the receiving space, and the driving device is located on the right side of the test box, with a through hole on a right wall of the test box for the first belt to pass through.

Further, the tension device comprises: a pulley fixed to the bottom surface of the receiving space and another pulley fixed to the stator of the generator, with a second belt disposed between the two pulleys.

Further, the tension device further comprises a second tension wheel for adjusting the tension of the second belt.

Further, the vibration test platform further comprises a base, with support rods extending upwards on both left and right sides of the base; wherein the table body has axles extending outward in the left-and-right direction on both sides, the axles on both sides have a same axis line and are rotatably connected to the support rods on their respective sides; the driving device is capable of rotating around the axis of the axle, and during the rotation, the distance between the driving device and the axis remains equal.

Further, the vibration test platform further comprises: a power consumption device, electrically connected to power output terminals of the generator.

Further, both the axle and the rotor extend in a horizontal direction.

Further, the vibration test platform further comprises: a fixing device, having a horizontal plate and a vertical plate which are fixed and connected to each other, and a plurality of reinforcing ribs arranged between the horizontal plate and the vertical plate; wherein the horizontal plate is fixed to the upper end of the movable coil, the stator of the generator is fixed to the vertical plate, and the rotor passes through the vertical plate; the first tension force acts on the vertical plate.

Further, the driving device is an electric motor.

An embodiment of the present invention provides a vibration test platform for an automobile generator, which has the following advantages: This embodiment discloses a vibration test platform for an automobile generator, comprising: a vibration table, a driving device, and a tension device; the vibration table comprises a table body and a movable coil located within the table body, the upper end of the movable coil extends from the upper surface of the table body, and the vibration table is capable of driving the movable coil to vibrate in the vertical direction; the driving device and the tension device are respectively located on the left and right sides of the movable coil; a generator is fixedly mounted on the upper surface of the table body, the rotating shaft of the driving device is rotationally connected to the rotor of the generator through a first belt, and the tension device applies a first tension force to the stator of the generator; when the movable coil is stationary, the second tension force from the first belt on the rotor is in the same line, opposite in direction, and equal to the first tension force, which is perpendicular to the direction of vibration of the movable coil. This vibration test platform is capable of conducting vibration tests on generators in automobiles.

DETAILED DESCRIPTION

Figure 1A:
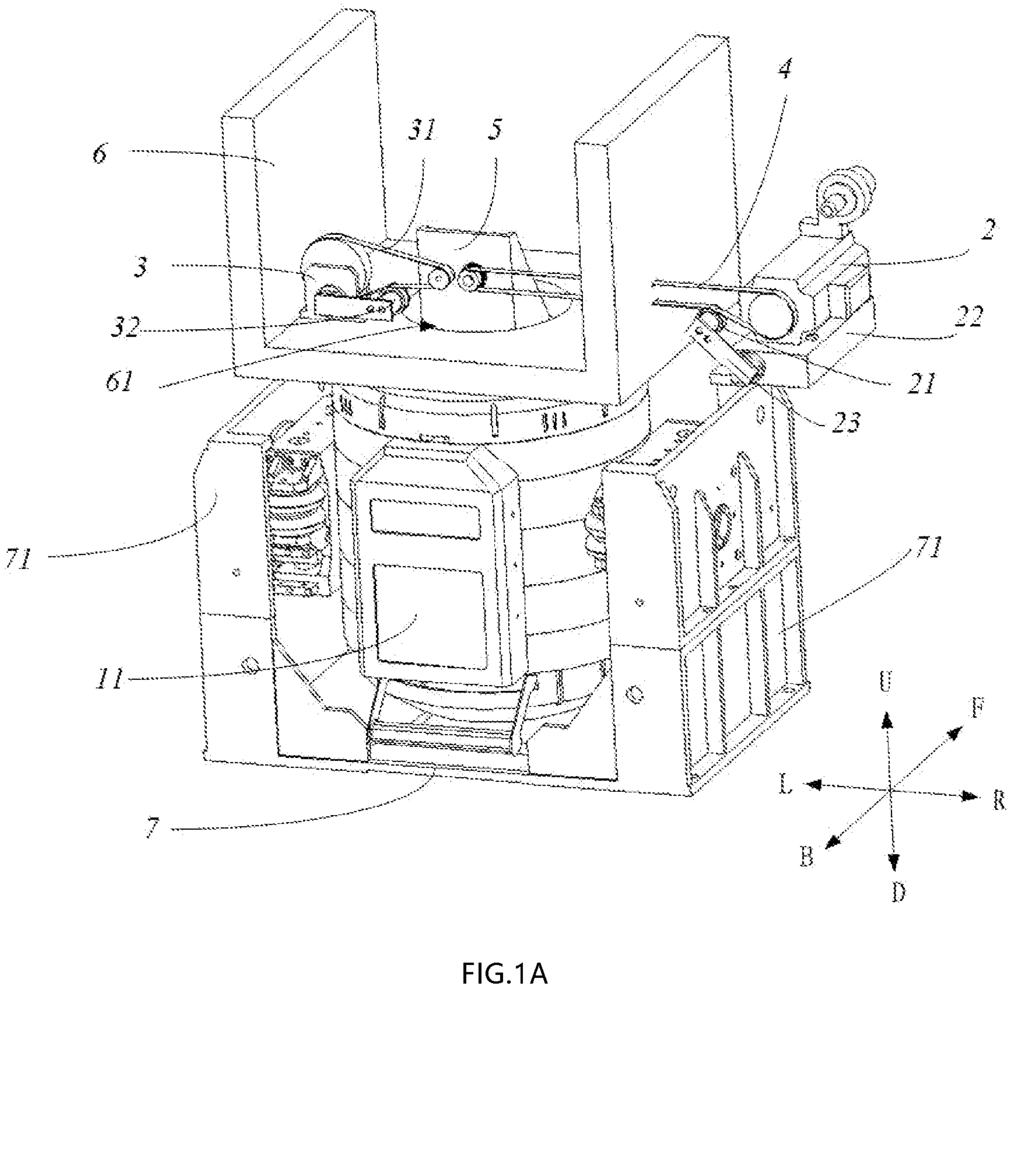
FIGS. 1A, 1B, and 2 are structural diagrams of the vibration test platform according to an embodiment of the present invention.

The embodiments of the invention are described in detail below with reference to the accompanying drawings. However, these embodiments do not limit the invention; any structural, methodological, or functional modifications made by those skilled in the art based on these embodiments are encompassed within the scope of this invention.

The following description and drawings sufficiently demonstrate specific embodiments of the invention, enabling those skilled in the art to implement them. Parts and features of some embodiments may be included in or replace parts and features of other embodiments. The scope of the embodiments of this document includes the entire range of the claims and all equivalents available to the claims. In this document, terms such as “first”, “second” and the like are used solely to distinguish one element from another without necessarily implying any actual relationship or order between them. Indeed, a first element could also be termed a second element, and vice versa. Moreover, terms “comprise”, “include”, or any of their variations are intended to cover a non-exclusive inclusion, such that a structure, device, or apparatus that includes a list of elements not only includes those elements but also includes other elements not expressly listed, or elements that are inherent to such a structure, device, or apparatus. An element defined by the statement “comprising a . . . ” does not exclude the presence of additional identical elements in the structure, device, or apparatus that comprises the element. The embodiments in this document are described in a progressive manner, with each embodiment focusing on the differences from other embodiments; similar parts between the various embodiments refer to each other.

The terms “longitudinal”, “transverse”, “upper”, “lower”, “front”, “back”, “left”, “right”, “vertical”, “horizontal”, “top”, “bottom”, “inner”, “outer” and the like in this document refer to the orientation or positional relationship shown in the drawings, solely for the convenience of describing this document and simplifying the description, rather than indicating or implying that the device or element involved must have a specific orientation, be constructed and operated in a specific orientation, and thus should not be understood as limiting the invention. In the description of this document, unless specifically stated or limited, terms such as “mounted”, “connected” and “linked” should be understood broadly, e.g., as being mechanically or electrically connected or internally communicative between two components, which could be directly connected or indirectly connected through an intermediate medium. Those skilled in the art can understand the specific meanings of the above terms as appropriate to the context.

In the schematic diagrams of the specification, the meanings of orientations are as follows: “U” denotes “Up”, “D” denotes “Down”, “L” denotes “Left”, “R” denotes “Right”, “F” denotes “Front” and “B” denotes “Back”.

As illustrated in the figures, a vibration test platform for an automobile generator in this embodiment of the invention comprises:

A vibration table 1, a driving device 2, and a tension device 3; here, as shown in FIG. 1A, the driving device 2 is located on a right side of the vibration table 1, and the tension device 3 is located on a left side of the vibration table 1.

The vibration table 1 comprises a table body 11 and a movable coil 12 located within the table body 11. An upper end of the movable coil 12 extends from an upper surface of the table body 11, and the vibration table 1 is capable of driving the movable coil 12 to vibrate in an up-and-down direction. The driving device 2 and the tension device 3 are respectively located on the left and right sides of the movable coil 12. The vibration table 1 can be equipped with a cavity, within which the movable coil 12 is positioned. This cavity further accommodates a driving device capable of driving the movable coil 12 to vibrate in the up-and-down direction, and the cavity is isolated from the external space.

A generator 13 is fixedly mounted on the upper surface of the table body 11. A rotating shaft of the driving device 2 is rotationally connected to a rotor of the generator 13 through a first belt 4. The tension device 3 applies a first tension force to a stator of the generator 13. When the movable coil 12 is stationary, a second tension force from the first belt 4 on the rotor is in a same line, opposite in direction, and equal to the first tension force, and the same line is perpendicular to the direction of vibration of the movable coil 12.

Here, the driving device 2 can be a motor or a fuel engine, etc., and comprises a control module capable of controlling an output power, rotational speed of the shaft, etc., of the driving device 2. The tension device 3 can be a spring or belt, etc., capable of applying the first tension force to the stator of the generator 13, with an adjustment module provided on the tension device 3 to adjust the magnitude of the first tension force.

It is understandable that, when the shaft rotates, it drives the rotor to rotate, and the first belt 4 will apply the second tension force to the rotor in the right direction. Thus, the second tension force will eventually act on the movable coil 12, causing uneven force distribution on the movable coil 12, and thereby affecting the normal operation of the vibration table 1. However, when the movable coil 12 is stationary (at this time, the movable coil 12 is at the midpoint position), since the first and second tension forces are in the same line, opposite in direction, and equal, the first and second tension forces cancel each other out. Furthermore, since the movable coil 12 vibrates up and down around the midpoint position with a small amplitude, when the movable coil 12 vibrates up and down, the first and second tension forces can still cancel each other out in the left-and-right direction, or even if they cannot completely cancel out, it can be considered that the force experienced by the movable coil 12 in the left-and-right direction is still very small.

During testing, the driving device 2 is controlled to drive the rotation of the rotor, and the movable coil 12 is controlled to vibrate in the vertical direction, thus simulating the working conditions of the generator 13 in a moving automobile.

Figure 1B:
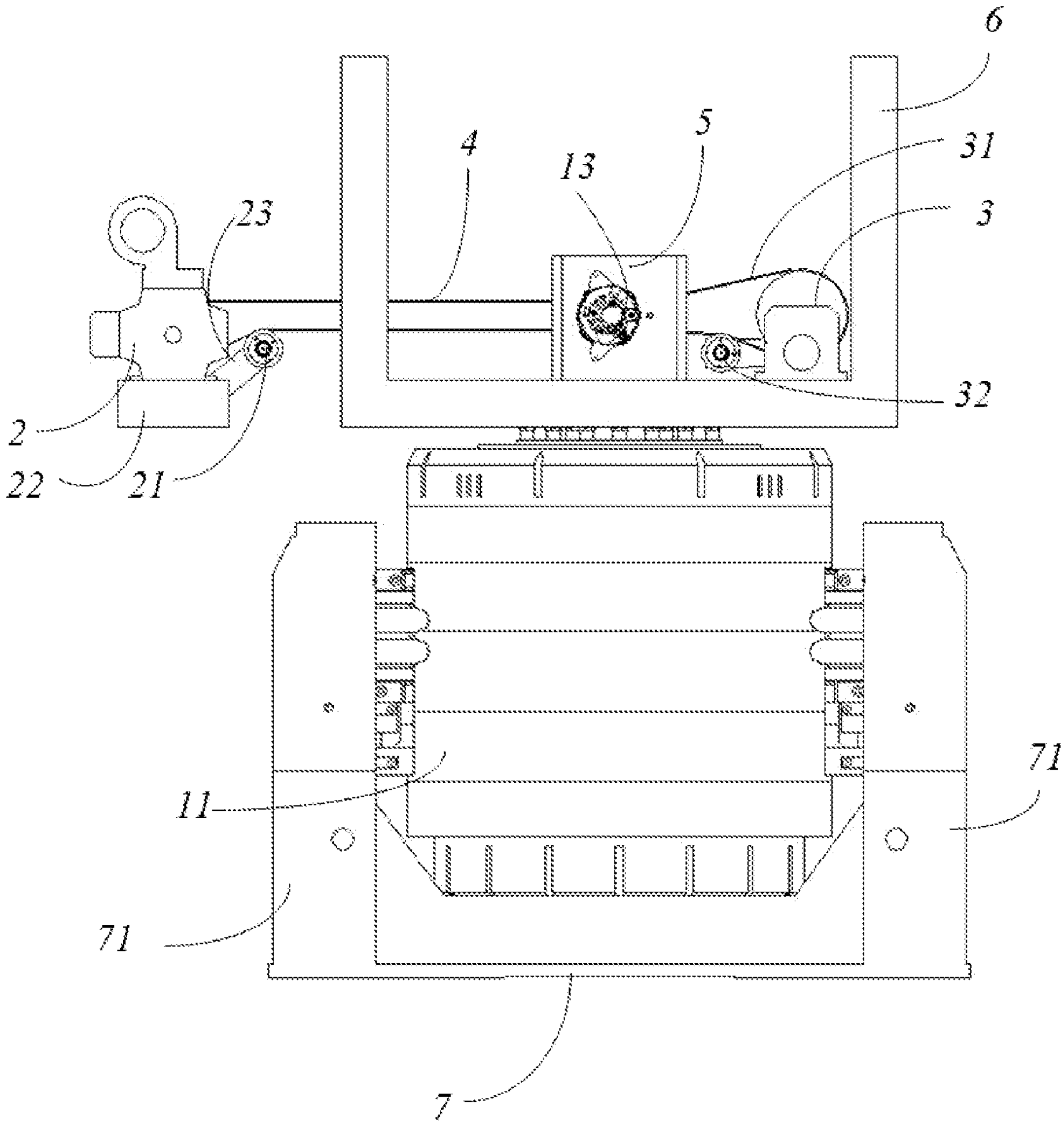

In this embodiment, the driving device 2 is equipped with a first tension wheel 21 for adjusting the tension of the first belt 4. Here, as shown in FIGS. 1A and 1B, the driving device 2 is fixed on a mounting base 22, which extends upwards and to the left with a rod 23. There is a rotatable connection between the rod 23 and the mounting base 22, and the first tension wheel 21 is located at an end of the rod 23 far from the mounting base 22. It is understood that the rod 23 can rotate relative to the mounting base 22, thereby adjusting the tension of the first belt 4. Moreover, a fixing device is arranged between the rod 23 and the mounting base 22, which has two states: (1) a released state, allowing the rod 23 to rotate relative to the mounting base 22; and (2) a fixed state, in which the rod 23 is immovable relative to the mounting base 22.

The vibration test platform in this embodiment further defines a test box 6, which is fixedly connected to the upper surface of the table body 11. The test box 6 has a receiving space with a through hole 61 at its lower part that connects to the receiving space, and the upper end of the movable coil 12 extends into the through hole 61. The tension device 3 is fixedly connected to a bottom surface of the receiving space, and the driving device 2 is located on the right side of the test box 6, with a through hole on a right wall of the test box 6 for the first belt 4 to pass through. Here, the test box 6 can be used to simulate the environment around the generator 13 during the operation of the automobile (e.g., the temperature and humidity within the receiving space can be adjusted).

In this embodiment, the tension device 3 comprises a pulley fixed to the bottom surface of the receiving space and another pulley fixed to the stator of the generator 13, with a second belt 31 disposed between the two pulleys.

Furthermore, the tension device 3 has a second tension wheel 32 for adjusting the tension of the second belt 31.

Additionally, the vibration test platform in this embodiment further defines a base 7 with support rods 71 extending upwards on both the left and right sides of the base 7. Axles extend outward in the left-and-right direction on both sides of the table body 11, with the axles on both sides having a same axis line and being rotatably connected to the support rods 71 on their respective sides. The driving device 2 can rotate around the axis of the axle, and during the rotation, the distance between the driving device 2 and the axis remains equal. In reality, the generator 13 in automobiles is subject to vibrations from multiple directions. In this embodiment, the vibration table 1 can rotate in the front-and-back direction relative to the base 7, allowing for the simulation of vibrations from multiple directions. Moreover, since the driving device 2 can also rotate around the axis of the axle, by synchronizing the rotation of the driving device 2 with the vibration table 1, the relative position between the vibration table 1 and the driving device 2 remains unchanged.

Optionally, the driving device 2 can be fixedly connected to the test box 6. Additionally, an axle can be passed through the support rod 71 to fix the driving device 2 onto the axle.

The vibration test platform in this embodiment further includes a power consumption device, which is electrically connected to power output terminals of the generator 13. In reality, the electrical energy produced by the generator 13 in automobiles is used by the electronic devices within the vehicle. Thus, to better simulate the working conditions of the generator 13, a power consumption device is provided, capable of consuming the electrical energy output by the generator 13.

In this embodiment, both the axle and the rotor extend in a horizontal direction.

Figure 2:
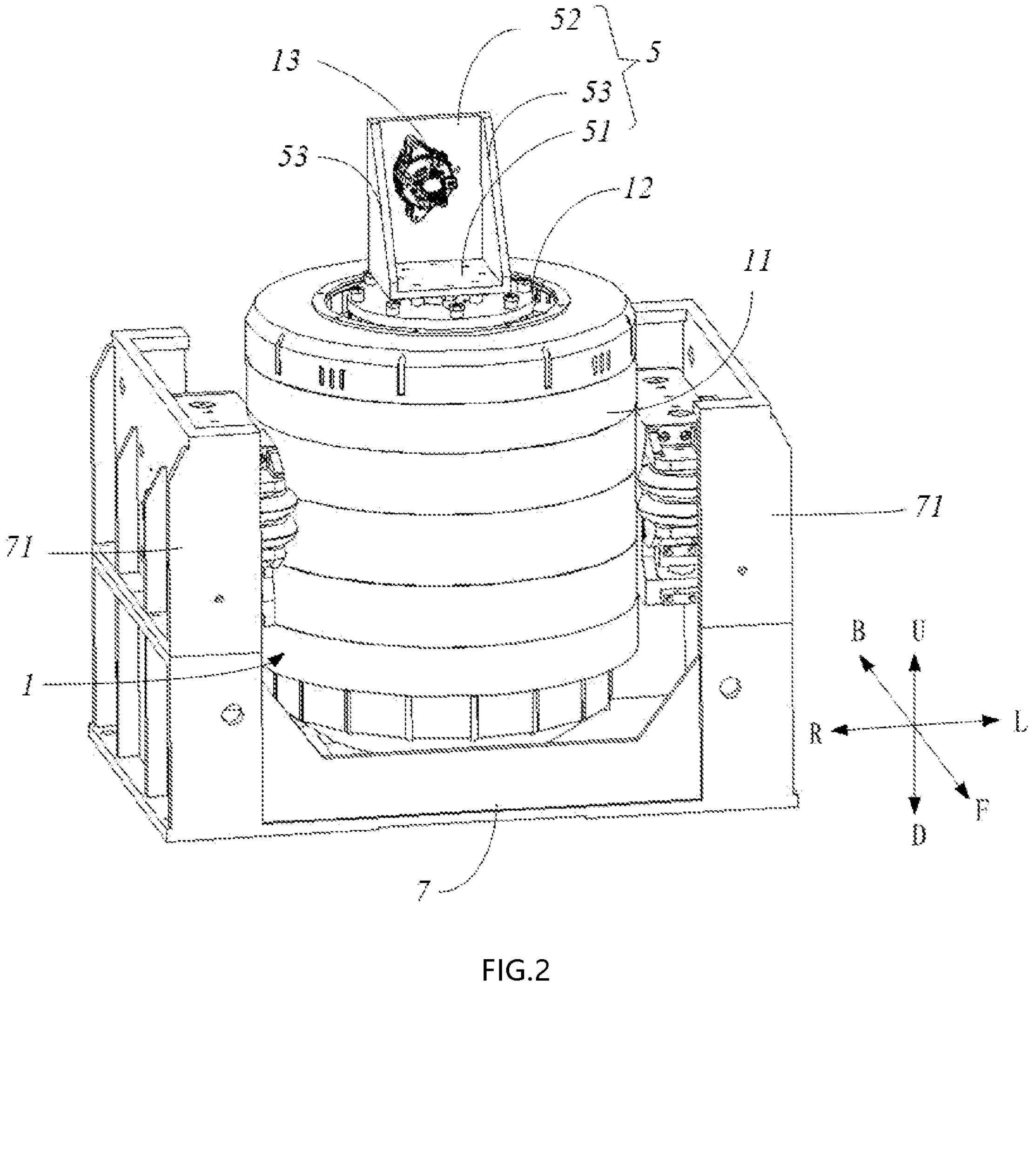

Additionally, the vibration test platform in this embodiment further comprises a fixing device 5, having a horizontal plate 51 and a vertical plate 52 which are fixed and connected to each other. A plurality of reinforcing ribs 53 are arranged between the horizontal plate 51 and the vertical plate 52; the horizontal plate 51 is fixed to the upper end of the movable coil 12, the stator of the generator 13 is fixed to the vertical plate 52, and the rotor passes through the vertical plate 52; the first tension force acts on the vertical plate 52. Here, as shown in FIGS. 1A and 2, bolts are used to connect the horizontal plate 51 to the upper end of the movable coil 12, a front end part of the horizontal plate 51 is fixedly connected to a lower end part of the vertical plate 52, and both left and right end parts of the horizontal plate 51 are provided with one reinforcing rib 53, and the reinforcing ribs are also fixedly connected to the left and right end parts of the vertical plate 52. Through holes are set on the vertical plate 52 penetrating its front and back surfaces, the front surface of the vertical plate 52 is fixed to the stator of the generator 13, the rotor of the generator passes through the through hole from a front-to-back direction, and a part of the rotor on the back surface is fixedly equipped with a pulley. Similarly, a pulley is further set on the driving device 2, with the first belt 4 set between the two pulleys.

In this embodiment, the driving device 2 is an electric motor.

It should be understood that although the specification is described in accordance with embodiments, not every embodiment contains a single independent technical solution. This description method of the specification is for clarity only. Those skilled in the art should consider the specification as a whole; technical solutions in the various embodiments may also be appropriately combined to form other embodiments understood by those skilled in the art.

The series of detailed explanations listed above are only for the specific illustration of the feasible embodiments of this invention and are not intended to limit the scope of this invention. Any equivalent embodiments or changes made without departing from the spirit of this invention should be included within the scope of this invention.

What is claimed is:

1. A vibration test platform for an automobile generator, comprising:

a vibration table (1), a driving device (2), and a tension device (3);

the vibration table (1) defining a table body (11) and a movable coil (12) located within the table body (11), an upper end of the movable coil (12) extending from an upper surface of the table body (11), and the vibration table (1) being capable of driving the movable coil (12) to vibrate in an up-and-down direction; the driving device (2) and the tension device (3) being respectively located on the left and right sides of the movable coil (12);

a generator (13) fixedly mounted on the upper surface of the table body (11), a rotating shaft of the driving device (2) being rotationally connected to a rotor of the generator (13) through a first belt (4), and the tension device (3) applying a first tension force to a stator of the generator (13); wherein when the movable coil (12) is stationary, a second tension force from the first belt (4) on the rotor is in a same line, opposite in direction, and equal to the first tension force, and the same line is perpendicular to the direction of vibration of the movable coil (12).

2. The vibration test platform according to claim 1, wherein the driving device (2) defines a first tension wheel (21) for adjusting the tension of the first belt (4).

3. The vibration test platform according to claim 1, further comprising:

a base (7), with support rods (71) extending upwards on both left and right sides of the base (7);

wherein the table body (11) has axles extending outward in the left-and-right direction on both sides, the axles on both sides have a same axis line and are rotatably connected to the support rods (71) on their respective sides;

the driving device (2) is capable of rotating around the axis of the axle, and during the rotation, the distance between the driving device (2) and the axis remains equal.

4. The vibration test platform according to claim 1, further comprising:

a power consumption device, electrically connected to power output terminals of the generator (13).

5. The vibration test platform according to claim 1, wherein both the axle and the rotor extend in a horizontal direction.

6. The vibration test platform according to claim 1, further comprising:

a fixing device (5), having a horizontal plate and a vertical plate which are fixed and connected to each other, and a plurality of reinforcing ribs arranged between the horizontal plate (51) and the vertical plate;

wherein the horizontal plate (51) is fixed to the upper end of the movable coil (12), the stator of the generator (13) is fixed to the vertical plate (52), and the rotor passes through the vertical plate (52);

the first tension force acts on the vertical plate (52).

7. The vibration test platform according to claim 1, wherein the driving device (2) is an electric motor.

8. The vibration test platform according to claim 1, further comprising:

a test box (6), fixedly connected to the upper surface of the table body (11), with a receiving space set inside the test box (6) and a through hole (61) at the lower part of the test box (6), which connects to the receiving space, and the upper end of the movable coil (12) extends into the through hole (61);

wherein the tension device (3) is fixedly connected to a bottom surface of the receiving space, and the driving device (2) is located on the right side of the test box (6), with a through hole on a right wall of the test box (6) for the first belt (4) to pass through.

9. The vibration test platform according to claim 8, wherein the tension device (3) comprises:

a pulley fixed to the bottom surface of the receiving space and another pulley fixed to the stator of the generator (13), with a second belt (31) disposed between the two pulleys.

10. The vibration test platform according to claim 8, wherein the tension device (3) further comprises a second tension wheel (32) for adjusting the tension of the second belt (31).

* * * * *